United States Patent
Inoue

(10) Patent No.: US 7,228,216 B2
(45) Date of Patent: Jun. 5, 2007

(54) AUTOMATIC SHIFT CONTROL APPARATUS AND METHOD FOR MANUAL TRANSMISSION

(75) Inventor: Hideaki Inoue, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 420 days.

(21) Appl. No.: 10/798,390

(22) Filed: Mar. 12, 2004

(65) Prior Publication Data

US 2004/0185985 A1 Sep. 23, 2004

(30) Foreign Application Priority Data

Mar. 19, 2003 (JP) ............................. 2003-075142

(51) Int. Cl.
*G06F 17/00* (2006.01)
(52) U.S. Cl. .................. 701/67; 701/68; 192/48.2; 192/48.7; 477/70; 477/80; 477/86; 477/87; 477/174; 477/175; 477/176; 477/180
(58) Field of Classification Search .............. 701/61, 701/67, 68; 192/48.2, 48.7; 477/70, 86, 477/87, 166, 174, 176, 180, 181
See application file for complete search history.

(56) References Cited

U.S. PATENT DOCUMENTS

| | | | | |
|---|---|---|---|---|
| 4,880,094 A | * | 11/1989 | Ohkumo | ............... 477/176 |
| 5,179,875 A | * | 1/1993 | Brown | ............... 477/154 |
| 6,009,768 A | | 1/2000 | Hoshiya et al. | |
| 6,077,188 A | * | 6/2000 | Futamura et al. | ............ 477/65 |
| 2003/0100985 A1 | * | 5/2003 | Matsumura et al. | ......... 701/55 |
| 2004/0230360 A1 | * | 11/2004 | Matsumura et al. | ......... 701/51 |

FOREIGN PATENT DOCUMENTS

| | | | |
|---|---|---|---|
| JP | 0627336 A2 | * | 7/1994 |
| JP | 9-196164 A | | 7/1997 |
| JP | 10-299884 A | | 11/1998 |
| JP | 11-82729 A | | 3/1999 |
| JP | 11-201271 A | | 7/1999 |
| JP | 2001-295898 A | | 10/2001 |

* cited by examiner

*Primary Examiner*—Richard Camby
*Assistant Examiner*—Brian J. Broadhead
(74) *Attorney, Agent, or Firm*—Foley & Lardner LLP

(57) ABSTRACT

In automatic shift control apparatus and method for a manual transmission, at least one clutch is interposed between an engine and the manual transmission and a controller performs a feedback control for an engagement force of the clutch after a gear shift for the manual transmission is ended in such a manner that an input revolution speed of the clutch is directed toward another revolution speed thereof after the gear shift occurs at a predetermined time variation rate, the controller setting mutually different feedback control gains in a variation region of the input revolution speed of the clutch in which the input revolution speed of the clutch is directed toward the other revolution speed after the gear shift occurs and in a convergence region of the input revolution speed in which the input revolution speed of the clutch has reached to the other revolution speed after the gear shift occurs.

20 Claims, 13 Drawing Sheets

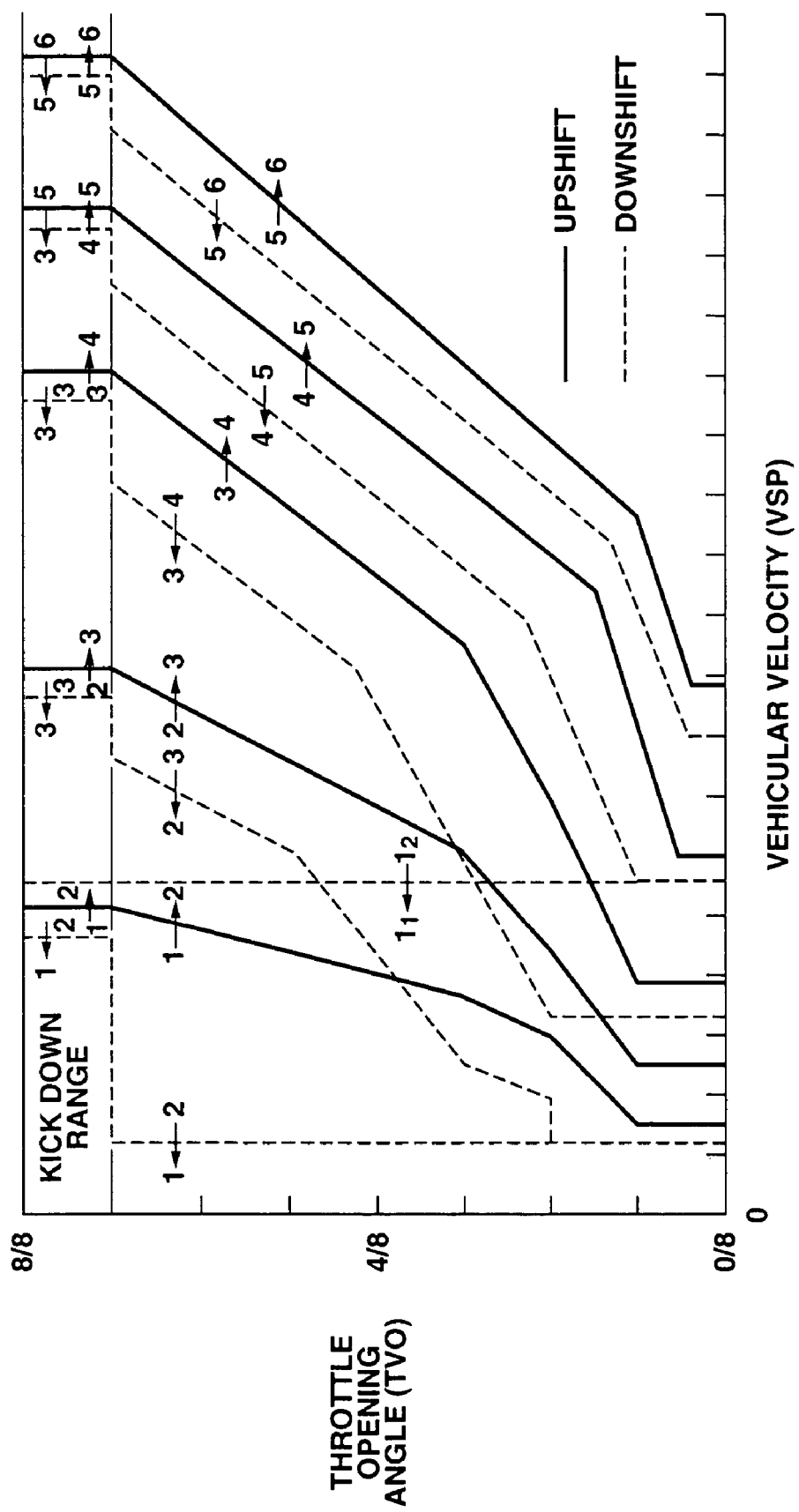

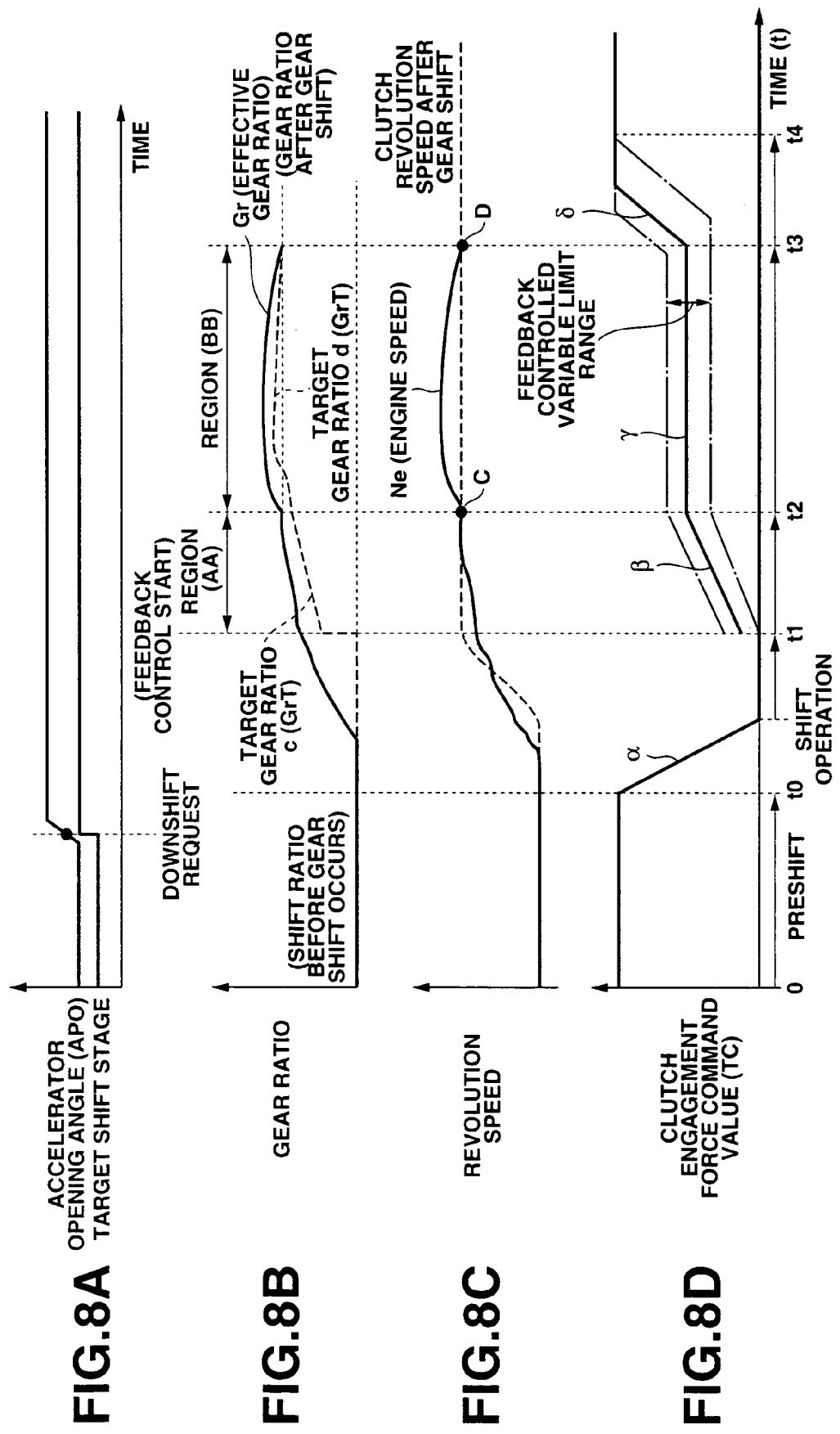

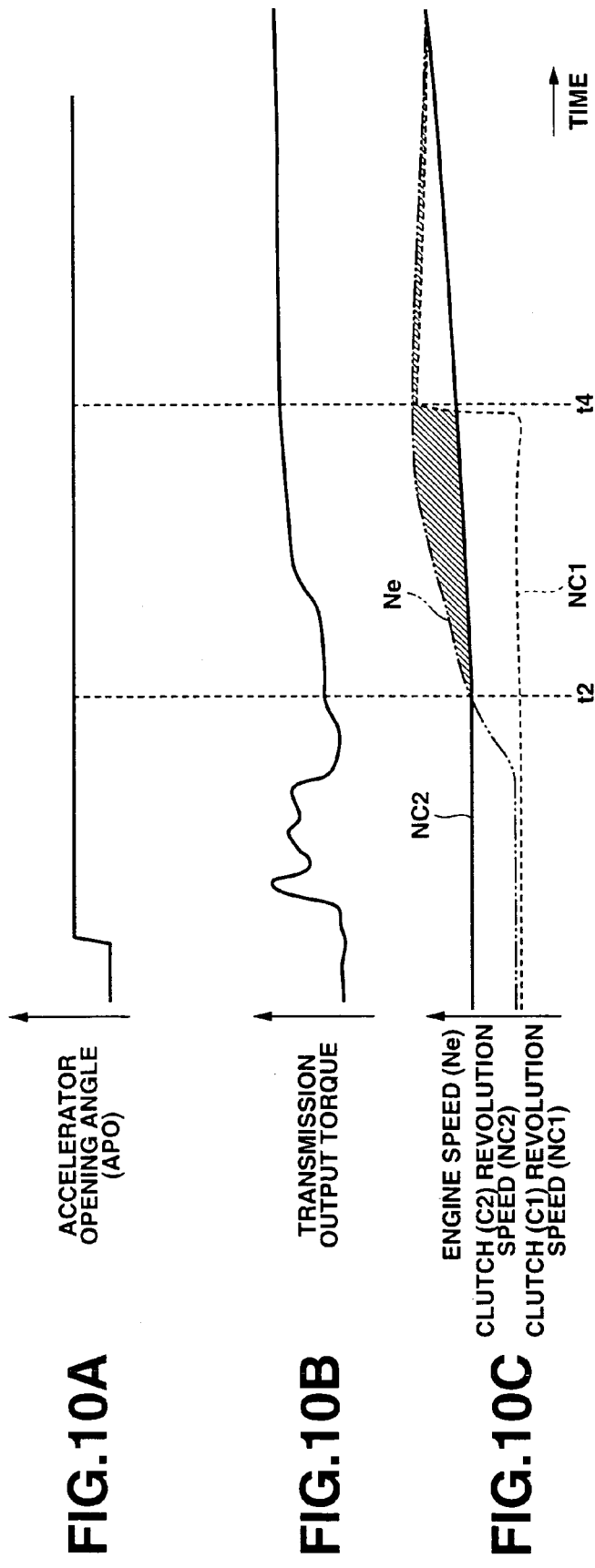

AUTOMATIC SHIFT CONTROL APPARATUS AND METHOD FOR MANUAL TRANSMISSION

BACKGROUND OF THE INVENTION

1. Field of the Invention

The present invention relates to automatic shift control apparatus and method for a manual transmission through release and engagement controls for at least one clutch interposed between an engine and the manual transmission and a shift control for the manual transmission.

2. Description of the Related Art

A Japanese Patent Application First Publication No. 2001-295898 published on Oct. 26, 2001 exemplifies a previously proposed automatic shift control apparatus for a manual transmission in which two clutches are installed for each group of shift stages divided into two groups, viz., a previously proposed manual transmission of a twin clutch type.

Another automatic shift control apparatus for a normally available manual transmission having a single clutch has been proposed. In each of these previously proposed automatic shift control apparatuses, when the gear shift occurs, the manual transmission is automatically shifted according to the release-and-engagement control for the clutch(es) and the shift control for the manual transmission in the same manner as a vehicle driver manipulates the manual transmission. Then, when the engagement of the clutch is carried out after the shift operation of the manual transmission, it is a common practice that an engagement force of the clutch is feedback controlled using a technique adopted in the automatic transmission in such a way that an effective gear ratio represented by a ratio between input and output revolution speeds of the transmission is changed from a previous gear ratio before the gear shift occurs to a gear ratio after the gear shift occurs with a predetermined time series variation.

SUMMARY OF THE INVENTION

However, if the clutch engagement is advanced by means of a feedback control while monitoring the effective gear ratio in the same manner as used in the automatic transmission, it is determined that a gear shift occurs when the effective gear ratio has reached to the gear ratio after the gear shift occurs and the clutch is completely engaged at a time. Hence, the following problem occurs in the previously proposed automatic shift control apparatuses for the manual transmission. That is to say, if a gain of the above-described feedback control is small, a shift response becomes worsened so that a vehicle driver gives an excessively slow feeling to the gear shift and a racing of the engine occurs. Hence, it is a general practice that the feedback control gain is set as large as possible without a range of an impediment. However, the gain is often excessively large due to a deviation in the apparatus itself and an individual difference of each of the manufactured apparatuses. In this case, after the effective gear ratio has reached to the gear ratio after the gear shift occurs, the effective gear ratio has exceeded the gear ratio after the gear shift occurs in the opposite direction. At this time, the clutch is still in a slip state. However, the control determines that the gear shift is ended since the effective gear ratio has reached to the gear ratio after the gear shift occurs. Then, the clutch is completely engaged at a time so that there is a possibility that a large shift shock occurs.

It is, therefore, an object of the present invention to provide automatic shift control apparatus for a manual transmission which improves an engagement force control of the clutch to solve the above-described problem which is particular to the automatic shift control apparatus for the manual transmission.

According to one aspect of the present invention, there is provided an automatic shift control apparatus for a manual transmission, comprising: at least one clutch interposed between an engine and the manual transmission; and a controller that performs a feedback control for an engagement force of the clutch after the controller ends a gear shift for the manual transmission in such a manner that an input revolution speed of the clutch is directed toward another revolution speed thereof after the gear shift occurs at a predetermined time variation rate, the controller setting mutually different feedback control gains in a variation region of the input revolution speed of the clutch in which the input revolution speed of the clutch is directed toward the other revolution speed after the gear shift occurs and in a convergence region of the input revolution speed in which the input revolution speed of the clutch has reached to the other revolution speed after the gear shift occurs.

According to another aspect of the present invention, there is provided an automatic shift control method for a manual transmission, comprising: providing at least one clutch interposed between an engine and the manual transmission; performing a feedback control for an engagement force of the clutch after a gear shift for the manual transmission is ended in such a manner that an input revolution speed of the clutch means is directed toward another revolution speed thereof after the gear shift occurs at a predetermined time variation rate; and, while performing the feedback control for the engagement force of the clutch, setting mutually different feedback control gains in a variation region of the input revolution speed of the clutch in which the input revolution speed of the clutch is directed toward the other revolution speed after the gear shift occurs and in a convergence region of the input revolution speed in which the input revolution speed of the clutch has reached to the other revolution speed after the gear shift occurs.

This summary of the invention does not necessarily describe all necessary features so that the invention may also be a sub-combination of these described features.

BRIEF DESCRIPTION OF THE DRAWINGS

FIG. 6 is a diagram representing a gear shift pattern used when an automatic shift control for the manual transmission is performed.

FIGS. 8A, 8B, 8C, and 8D are integrally an operational timing chart in accordance with the operational flowchart executed by the transmission controller in a case of the second embodiment shown in FIGS. 7A, 7B, and 7C.

FIGS. 10A, 10B, and 10C are simulation operational timing charts in which no feedback control for the engagement force of the clutch is performed as a comparative example with the first embodiment of the automatic shift control apparatus.

DETAILED DESCRIPTION OF THE PREFERRED EMBODIMENTS

Reference will hereinafter be made to the drawings in order to facilitate a better understanding of the present invention.

Figure 1:
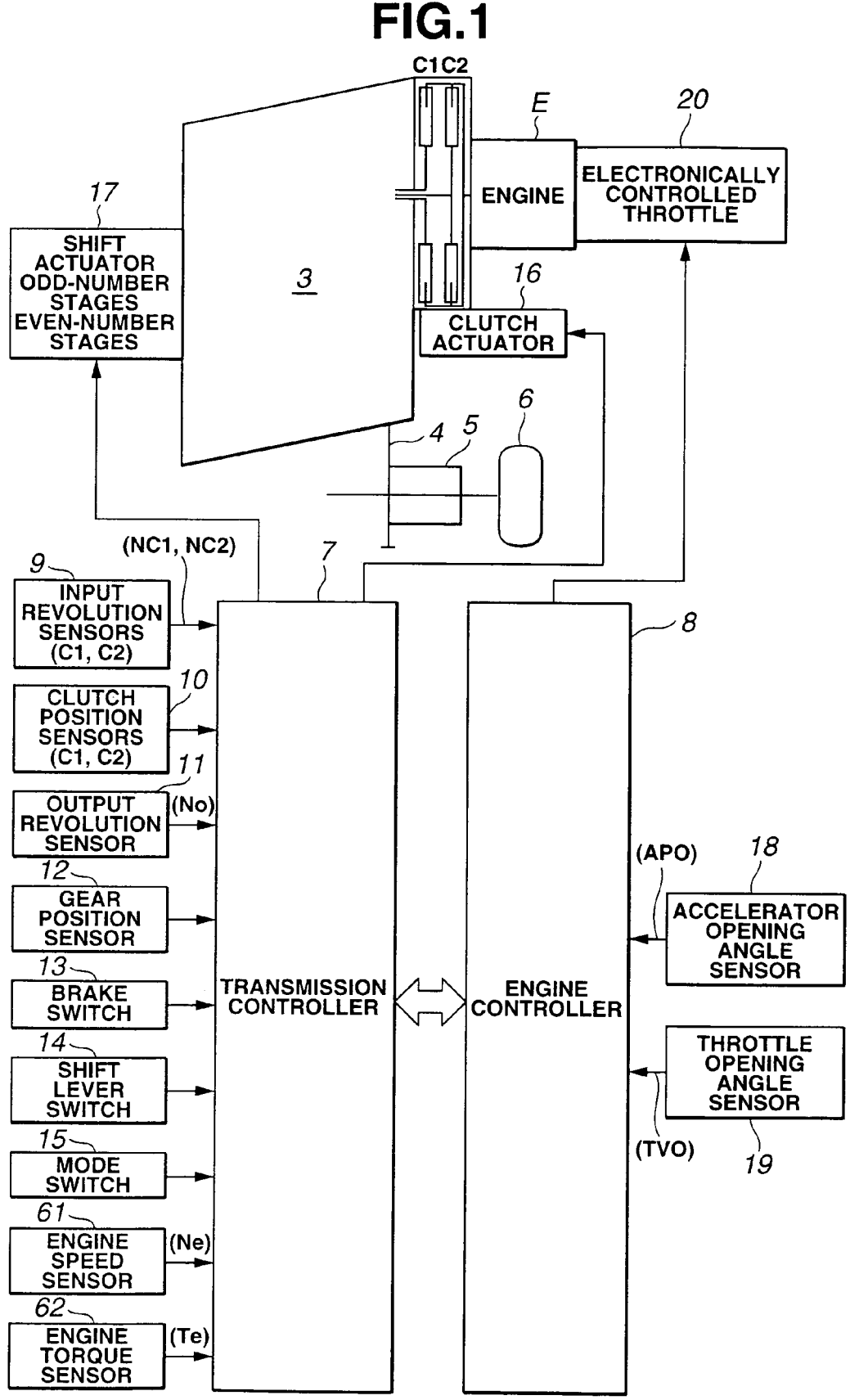
FIG. 1 is a schematic block diagram of a manual transmission of a twin clutch type to which an automatic shift control apparatus in a first preferred embodiment according to the present invention is applicable.

FIG. 1 is a control system of a manual transmission to which an automatic shift control apparatus in a first preferred embodiment according to the present invention is applicable.

In the first embodiment, a manual transmission 3 is constituted by a twin clutch type manual transmission. An odd number gear shift stage clutch C1 and an even number gear shift stage clutch C2 are interposed between manual transmission 3 and an engine E as will be described later. After manual transmission 3 makes the gear shift for an engine revolution inputted via clutch C1 or C2 at the gear ratio in accordance with a selected gear shift stage, an engine revolution is transmitted to each driven wheel 6 sequentially via a final drive ring gear 4 and a differential gear unit 5.

Manual transmission 3 includes: a clutch casing 21 in which odd number gear shift stage clutch C1 and even number gear shift stage clutch C2; and a transmission casing 22 connected to clutch casing 21 and in which a gear shift mechanism as will be described later is housed. A clutch input member 24 coupled to engine output axle 23 and common to both clutches C1 and C2, a clutch output member 25 of odd number gear shift stage clutch C1, and a clutch output member 26 of even number gear shift stage clutch C2 are housed within clutch casing 21. Odd number gear shift stage clutch C1 is constituted by clutch input member 24, clutch output member 25. Even number gear shift stage clutch C2 is constituted by clutch input member 24 and clutch output member 26.

A hollow axle 27 is coupled to odd number gear shift stage clutch output member 25. Even number gear shift stage clutch output member 26 is coupled to an even number gear shift stage input axle 32 rotatably supported on a hollow portion of hollow axle 27. These hollow axle 27 and even number gear shift stage input axle 32 penetrate a partitioning wall between clutch casing 21 and transmission casing 22 and are projected from clutch casing 21 within transmission casing 22. Even number gear shift stage input axle 32 is rotatably and laterally mounted within transmission casing 22. An odd number gear shift stage input axle 31 and common output axle 33 are rotatably and laterally mounted within transmission casing 22 in parallel to even number gear shift stage input axle 32. An input gear 34 is coupled to an end portion of hollow axle 27 projected within transmission casing 22. A gear 37 disposed within a right angle plane as the same axle is coupled to odd number gear shift stage input axle 31. An idler gear 36 which is revolved on an idler axle 35 is meshed with these gears 34 and 37. Thus, the engine revolution from odd number gear stage clutch C1 to hollow axle 27 is transmitted to odd number gear shift stage input axle 31. A first-speed drive gear 41, a third-speed drive gear 43, a fifth-speed gear 45, and a reverse drive gear 47 are rotatably disposed on odd number gear shift stage input axle 31. A second-speed drive gear 42, a fourth-speed drive gear 44, and a sixth-speed drive gear 46 are rotatably disposed on even number gear shift stage input axle 32. A first-second speed driven gear 48 which is meshed with drive gears 41 and 42, a third-fourth speed driven gear 49 which are meshed with drive gears 43 and 44, a fifth-and-sixth driven gear 50 which are meshed with drive gears 45 and 46, and a reverse driven gear 51 are integrally rotatably mounted on common output axle 33. A reverse idler gear 53 meshed with reverse drive gear 47 and with reverse driven gear 51 permits the transmission between reverse drive gear 47 and reverse driven gear 53, reverse idler gear 53 being rotatably supported via idler axle 52 within transmission casing 22.

Furthermore, a first-third speed synchronization (or synchro) mechanism (synchromesh) 55 interposed between drive gears 41 and 43 and a fifth-reverse speed synchronization mechanism (synchromesh) 55 are mounted on odd number gear shift stage input axle 31. First-third speed synchronization mechanism (synchromesh) 54 drivingly couples first-speed drive gear 41 to above-described axle 31 when a coupling sleeve 54a moves in a rightward direction as viewed from FIG. 2 with respect to a neutral position shown in FIG. 2. Thus, the engine revolution to this axle 31 is transmitted to output axle 3 via first-speed drive gear 41 and driven gear 48 to achieve a first-speed selection state (①). When coupling sleeve 54a is moved in a leftward direction from the neutral position shown in FIG. 2, third-drive gear 43 is drivingly coupled to axle 31 so that the engine revolution to axle 31 is transmitted to output axle 33 from third-speed drive gear 43 to output axle 33 via driven gear 49 to achieve a third-speed selection state (③).

Figure 2:
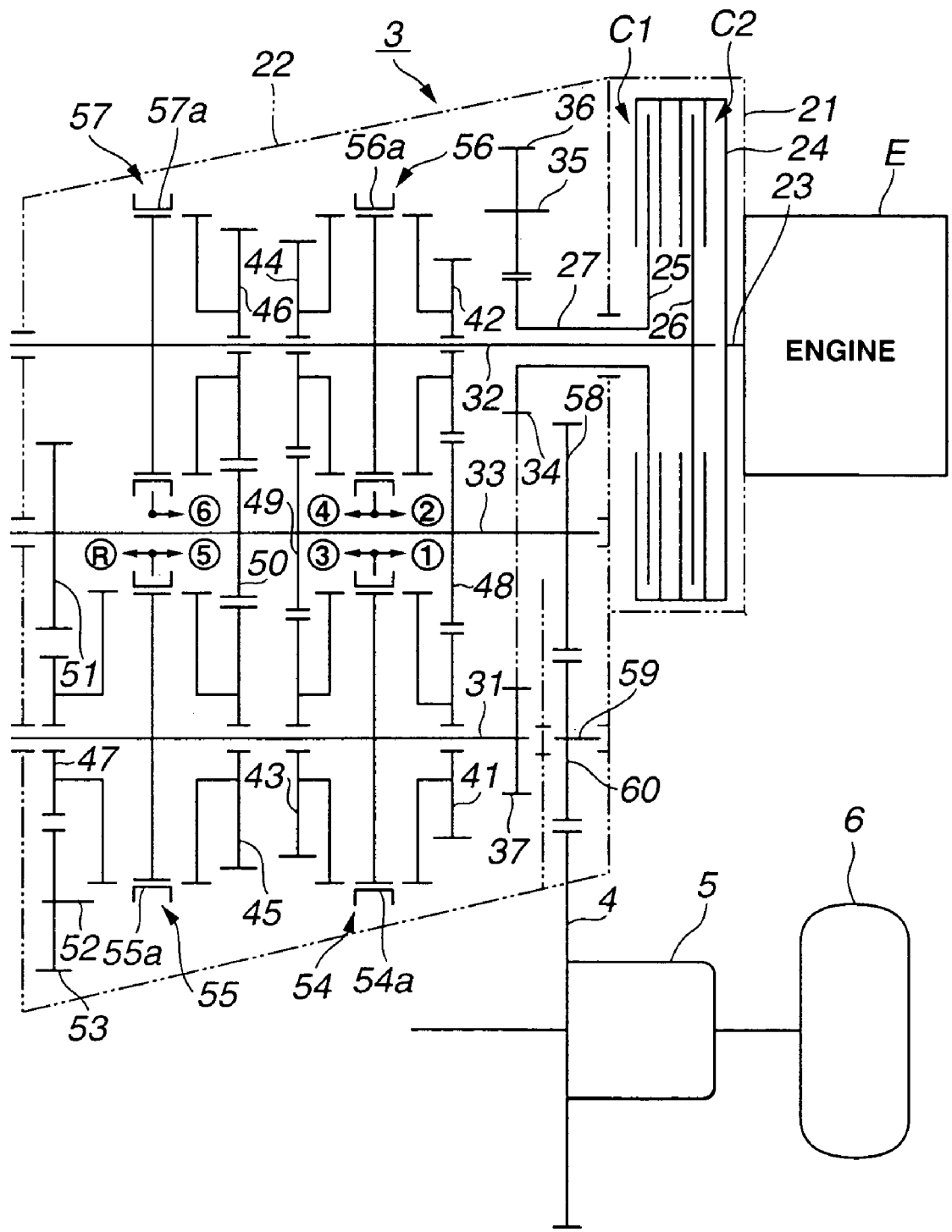
FIG. 2 is a skeleton view of the manual transmission of the twin clutch type representing an internal structure of the manual transmission of the twin clutch type shown in FIG. 1.

Fifth-reverse speed synchronization mechanism (synchromesh) 55 drivingly couples fifth-speed drive gear 45 to axle 31 to transmit the engine revolution to output axle 33 via fifth-speed drive gear 45 via driven gear 50 to achieve a fifth-speed selection state (⑤) when coupling sleeve 55a is moved in the rightward direction with respect to the neutral position shown in FIG. 2.

When coupling sleeve 55a is moved in the leftward direction with respect to the neutral position shown in FIG. 2, fifth-speed reverse synchronization mechanism 55 drivingly couples reverse drive gear 47 to axle 31 to reversely transmit the engine revolution to this axle 31 to output axle 33 via reverse drive gear 47, idler gear 53, and driven gear 51 to achieve a reverse selection state (Ⓡ). A second-fourth speed synchronization mechanism (synchromesh) 56 interposed between second-speed drive gear 42 and fourth-speed drive gear 44 and a sixth-speed synchronization mechanism (synchromesh) 57 disposed adjacently to sixth-speed drive gear 46 are, furthermore, mounted on even number gear shift stage input axle 32. Second-fourth speed synchronization (synchromesh) mechanism 56 drivingly couples second-speed drive gear 42 to axle 32 to transmit the engine revolution to this axle 32 to output axle 33 via second-speed drive gear 42 via driven gear 48 to achieve a second-speed selection state (②) when coupling sleeve 56a is moved toward the rightward direction from the neutral position shown in FIG. 2. When coupling sleeve 56a is moved in the leftward direction from the neutral position shown in FIG. 2, second-fourth speed synchronization mechanism (synchromesh) 56 drivingly couples fourth-speed drive gear 44 to axle 32 to achieve a fourth-speed selection state (*ecrc*;4) in which the engine revolution to this axle 32 is transmitted to output axle 33 via *second-speed* drive gear 42 to output axle 33 via driven gear 49. S*ixth-speed* synchronization mechanism (*synchromesh*) 57 drivingly couples a *sixth-speed* drive gear 46 to axle 32 to transmit the engine revolution to this axle 32 to output axle 33 via *sixth-speed* drive gear 46 and via driven gear 50 to achieve a *sixth-speed* selection state (⑥) when coupling sleeve 57 is moved in the rightward direction from the neutral position shown in FIG. 2.

Final drive gear 58 is integrally and rotatably mounted on an end position of common output axle 38 and a final drive idler gear 60 rotatably mounted on idler axle 59 drivingly couples between final drive gear 58 and final driving gear 4. Hence, the revolution of the transmission reached to output axle 33 is transmitted to differential gear unit 5 via final drive gear 58, final drive idler gear 60, and final drive ring gear 4 to drive a road wheel 6. As appreciated from the above, odd number gear shift stage clutch C1 is a clutch to be engaged (hereinafter, also simply referred to as an engagement side clutch) when the above-described gear shift mechanism selects the odd number gear shift stage such as the first speed, the third speed, the fifth speed, and the reverse. In addition, even number gear shift stage clutch C2 is a clutch to be engaged (engagement side clutch) when the gear shift mechanism selects the even number gear shift stage such as the second speed, the fourth speed, and the sixth speed. It is noted that the clutch to be released is simply referred to as a release side clutch.

Manual transmission 3, at each gear shift stage, converts a revolution torque inputted from either odd number gear shift stage clutch C1 or even number gear shift stage clutch C2 which is driven from engine E into a gear ratio corresponding to the gear shift stage to transmit the revolution torque to output axle 33 and final drive gear 58 and the corresponding torque is transmitted to driven wheel 6 via final drive ring gear 4 and differential gear unit 5.

When a gear shift to select each shift stage is carried out, a preshift in which one of odd number gear shift stage clutch C1 and even number gear shift stage clutch C2, ordinarily, both clutches being in the engagement states, which corresponds to the gear shift stage to be next selected (the engagement side clutch to be the next engaged) is released is carried out. Thereafter, while the other clutch which corresponds to the gear shift stage under the selection (the release side clutch to be the next released) is released under the engagement state, a clutch replacement such that the released engagement side clutch during the preshift is replaced with the clutch to be engaged is carried out to make the gear shift. After the gear shift, the release side clutch is also engaged.

The clutching (engagement) and release of these clutches C1 and C2 are carried out by means of, for example, an electrically driven clutch actuator 16 shown in FIG. 1. A shift of manual transmission 3 to stroke coupling sleeves 54a, 55a, 56a, and 57a when the gear shift is carried out by means of an electrically driven shift actuator 17 shown in FIG. 1. Clutch actuator 16 and shift actuator 17 are electronically controlled by means of a transmission controller 7. An output of engine E is controlled by means of an electronically controlled throttle (valve) 20 and opening angle of electronically controlled throttle (valve) 20 is controlled by means of engine controller 8. Transmission controller 7, in order to perform these controls, inputs signals from input revolution sensors 9 to detect input revolution speeds NC1 and NC2 from clutch to manual transmission 3 when either of clutch C1 or clutch C2 is engaged, signals from clutch position sensors 10 which detect each operation position (engagement, release) of clutches C1 and C2, a signal from an output revolution sensor 11 to detect an output revolution speed $N_O$ (vehicle speed (or vehicular velocity) VSP) from manual transmission 3, a signal from a gear position sensor 12 to detect the present selected gear shift stage from an operation state of shift actuator 17, a signal from a brake switch 13 which is turned on when the vehicle driver depresses a brake pedal, a signal from a shift lever switch 14 which detects a position of the shift lever, a signal from engine speed sensor 61 to detect an engine speed Ne, and a signal from engine torque sensor 62 to detect an engine (output) torque Te.

On the other hand, engine controller 8 receives a signal from accelerator opening angle sensor 18 to detect a depression depth (manipulated variable) (APO) of an accelerator pedal, and a signal from a throttle opening angle sensor 19 to detect an opening angle (TV0) of electronically driven throttle (valve) 20. An information exchange can be carried out in a bidirectional communication between engine controller 8 and transmission controller 7. When a drive torque is transmitted to engine controller 8 from transmission controller 7, engine controller 8 operates electronically controlled throttle (valve) 20 in accordance with a demand drive torque and varies the ignition timing so that the requested driving torque can be achieved.

Figure 3A:
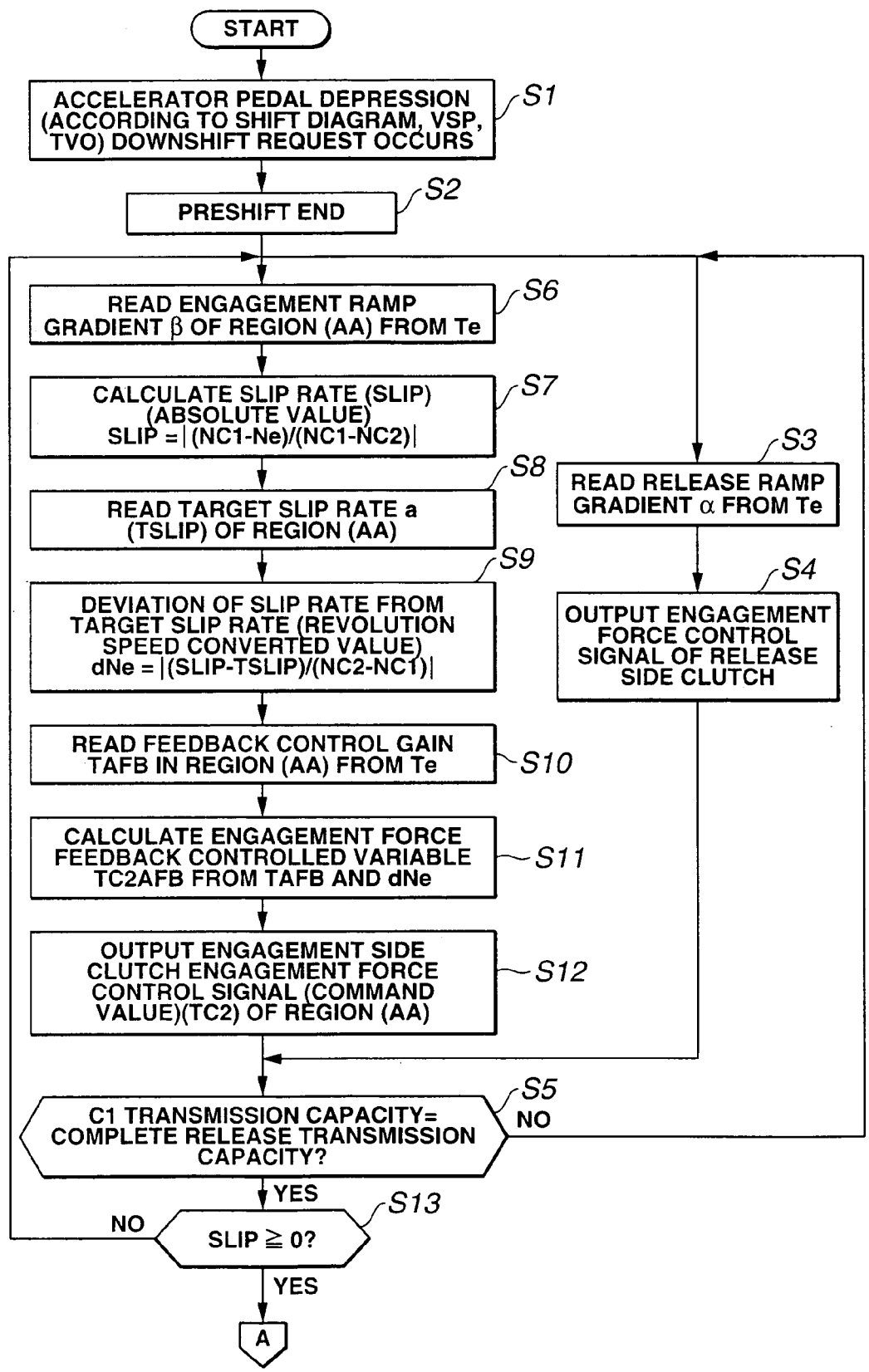
FIGS. 3A and 3B are integrally an operational flowchart representing a gear shift control program executed by a transmission controller shown in FIG. 1.
Figure 3B:
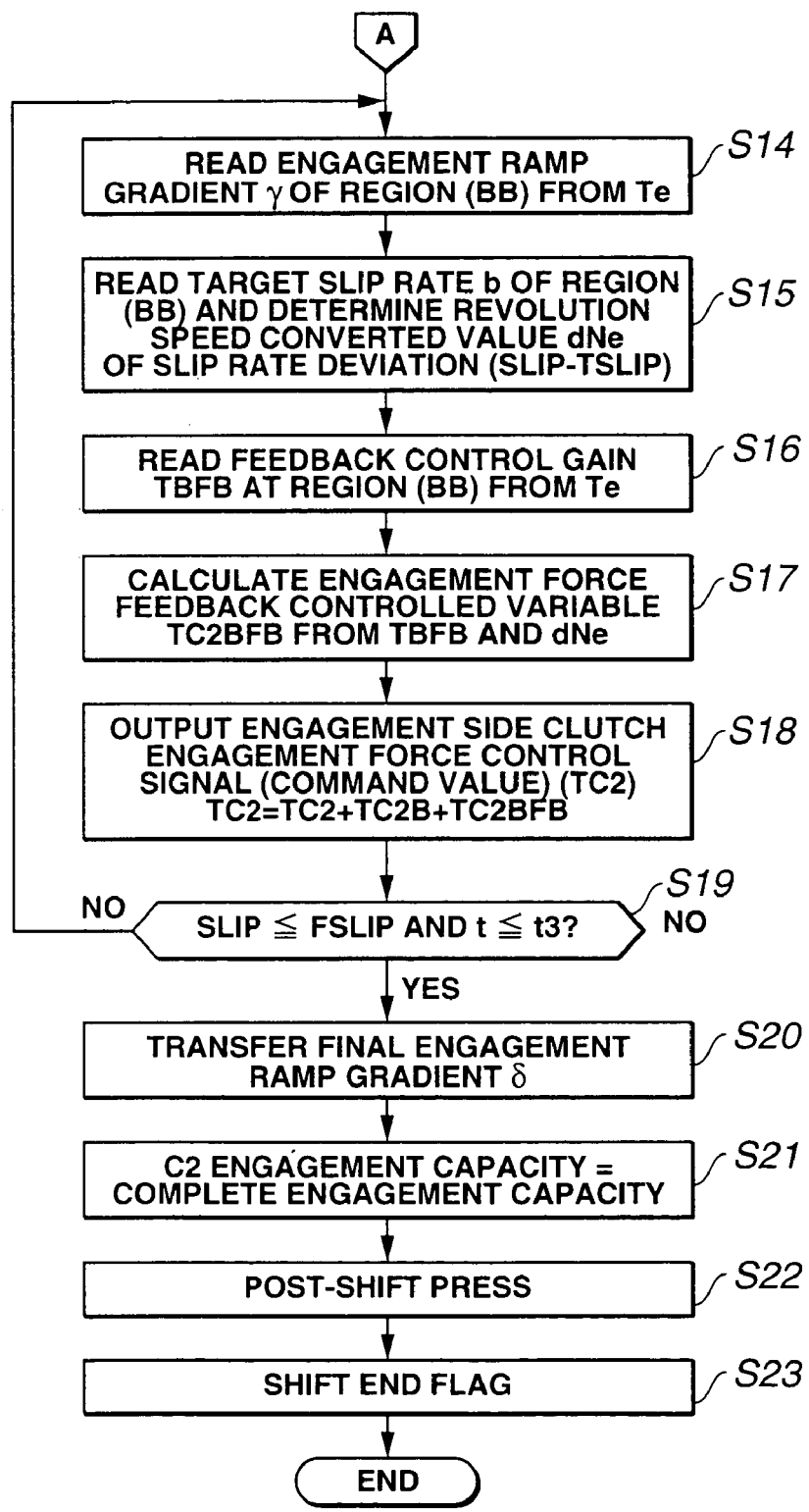

Transmission controller 7 executes a control program shown in FIGS. 3A and 3B on the basis of the above-described input information so that the automatic shift control of manual transmission 3 which aims at the present invention as shown in FIGS. 4A, 4B, 4C, and 4D is carried out. It is noted that, in FIGS. 3A and 3B and FIGS. 4A through 4D, along with the depression of accelerator pedal by means of the driver, clutch C1 (in this case, the release side clutch) is released and the other clutch C2 (in this case, engagement side clutch) is engaged so that a downshift operation is carried out. This case will herein be described below with reference to an integral flowchart shown in FIGS. 3A and 3B.

At a step S1, transmission controller 7 determines whether a gear shift request occurs on the basis of whether another gear shift stage is requested which is different from the present gear shift stage which is now selected on the basis of a predetermined gear shift pattern (gear shift diagram) exemplified in FIG. 6 according to vehicle speed (vehicular velocity) (VSP) and opening angle (TVO) of throttle valve 20. If the downshift request along with the depression of the accelerator occurs, the routine goes to a step S2 at which the above-described preshift is carried out. At an instantaneous time (time point) of t1 shown in FIGS. 4A through 4D at which the pre-shift is ended, the control is advanced to steps S3 and S4 so that the automatic shift control which is the aim of the present invention is carried out as will be described later. At step S3, a release ramp gradient α of release side clutch C1 is determined, for example, as shown in FIGS. 4A through 4D, in accordance with engine torque Te. At the next step S4, an engagement force command value TC1 of release side clutch C1 is reduced by a value of TC1B corresponding to release ramp gradient α. The engagement force command value TC1 of release side clutch C1 is gradually reduced at a ramp gradient α as shown in FIGS. 4A, 4B, 4C, and 4D, and release side engagement force command value TC1 is outputted to clutch actuator 16. The process at steps S3 and S4 is continued unless the engagement capacity of the release side clutch C1 (torque transmission capacity) at step S5 indicates a complete release capacity.

In parallel to the release control over the release side clutch C1, an engagement control for engagement side clutch C2 is carried out in the following way after a step S6. In details, at step S6, a first engagement ramp gradient β at an input revolution speed variation region (AA), viz., a time duration from instantaneous time t1 to instantaneous time (time point) t2 during which engine speed Ne which is the input revolution speed of the engagement side clutch C2 is directed toward a post gear shift clutch (C2) revolution speed corresponding to the gear ratio after the gear shift occurs is determined, for example, as shown in FIGS. 4A through 4D, in accordance with engine torque Te. At the next step S7, transmission controller 7 calculates a slip rate (absolute value) of engagement side clutch C2 as follows: SLIP=|(NC1−Ne)/(NC1−NC2)|. At the next step S8, transmission controller 7 reads a target slip rate a (TSLIP) of the engagement side clutch C2 in input revolution speed variation region (AA) as exemplified by FIGS. 4A through 4D. This target slip rate a (TSLIP) is arbitrarily determined at the stage of a design. This permits a flavoring of the gear shift.

At the next step S9, transmission controller 7 calculates a revolution speed converted value dNe of a deviation of actual slip rate SLIP with respect to target slip rate a (TSLIP): dNe=(SLIP−TSLIP)×(NC2−NC1).

At the next step S10, transmission controller 7 determines a feedback control gain TAFB of the engagement force control of engagement side clutch C2 in accordance with engine torque Te so as to approach (nullify) a slip rate deviation (SLIP−TSLIP) to zero in the input revolution speed variation region (AA). At the next step S11, engagement force feedback controlled variable TC2AFB is derived according to the revolution speed converted value dNe of the deviation of the slip rate (SLIP−TSLIP) determined at step S11.

At the step S11, transmission controller 7 determines an engagement force feedback controlled variable TC2AFB from feedback gain TAFB and revolution speed converted value dNe of the slip rate deviation (SLIP−TSLIP) determined at step S9.

Figures 4A, 4B, 4C, 4D:
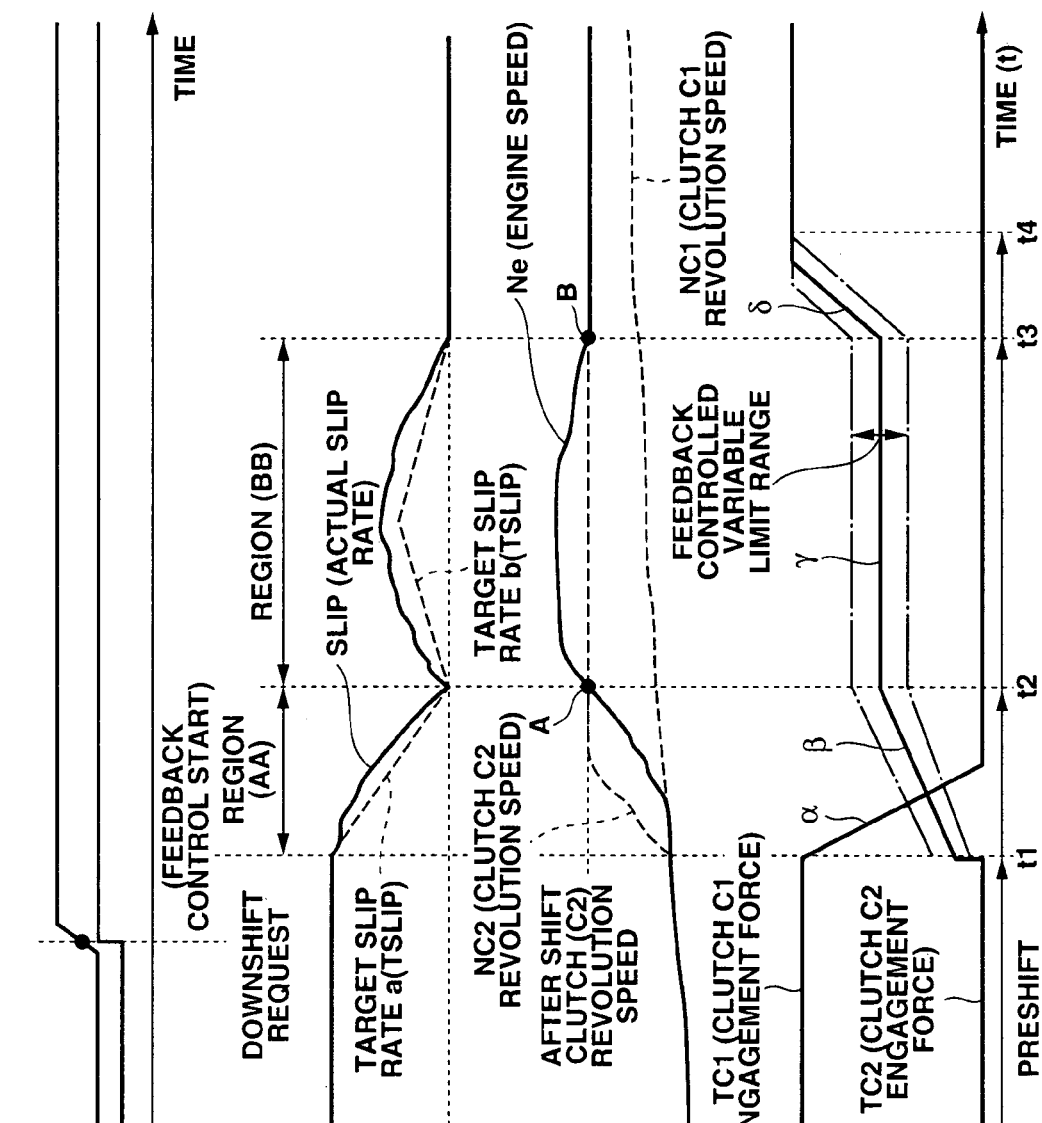
FIGS. 4A, 4B, 4C, and 4D integrally show an operational timing chart representing a gear shift control operation in accordance with the operational flowchart executed by the transmission controller shown in FIGS. 3A and 3B.

At the next step S12, transmission controller 7 raises an engagement force command value TC2 of engagement side clutch C2 by a value of TC2A corresponding to ramp gradient β determined at step S6 and adds feedback controlled variable TC2AFB determined at step S11 to TC2A so that an engagement force command value TC2 of the engagement side clutch C2 is gradually increased at ramp gradient β as shown in FIGS. 4A through 4D from instantaneous time t1 of the engagement side clutch C2, and adjusts the engagement force command value TC2 within a feedback controlled variable limit range denoted by dot-and-dash lines shown in FIG. 4D so that the slip rate deviation (SLIP−TSLIP) is zeroed and the engagement force command value TC2 of the engagement side clutch C2 is outputted to clutch actuator 16. The engagement control of the engagement side clutch C2 is continued until the engagement capacity (torque transmission capacity) of releasing side clutch C1 at step S5 is determined to become the complete release capacity and is determined at a step S13 that slip rate SLIP at step S13 is equal to or larger than zero, in other words, until engine revolution speed Ne reaches to a point A (instantaneous time t2) at which engine speed Ne reaches to the revolution speed of post gear shift clutch (C2) as shown in FIG. 4C corresponding to the gear shift ratio after the gear shift occurs.

If transmission controller 7 determines that slip rate SLIP at step S13 is equal to or larger than zero, viz., engine speed Ne has reached to point A (instantaneous time t2) at which engine speed Ne has reached to clutch (C2) revolution speed after the gear shift occurs, the routine goes to a step S14 to start the engagement force control for engagement side clutch C2 in the convergence region (BB) of the input revolution speed as will be described below.

At step S14, transmission controller 7 determines an engagement ramp gradient γ at an input revolution speed convergence region (BB) from time point A at which engine speed Ne has reached to clutch (C2) revolution speed after the gear shift occurs shown in FIG. 4C (instantaneous time t2) to time point B shown in FIG. 4 (instantaneous time (ime point) t3) at which engine speed Ne has converged to the input revolution speed of the engagement side clutch (C2) after the gear shift occurs in accordance with engine torque Te, for example, as shown in FIG. 4D.

At the next step S15, transmission controller 7 reads a target slip rate b (TSLIP) of engagement side clutch C2 as shown in FIGS. 4A through 4D at the input revolution speed convergence region (BB). (It is noted that target slip rate b is determined arbitrarily at a stage of a design in accordance with the flavoring of the gear shift). Then, transmission controller 7 determines revolution speed converted value dNe of the deviation (SLIP−TSLIP) on the slip rate between the slip rate SLIP (absolute value) of engagement side clutch C2 determined in the same way as step S7 and target slip rate b (TSLIP) in the same manner as step S9. At the next step S16, transmission controller 7 determines a feedback gain TBFB for the engagement force control of engagement side clutch C2 to carry out the elimination of slip rate deviation (SLIP−TSLIP) at input revolution speed convergence region (BB) in accordance with engine torque Te. It is noted that this feedback control gain TBFB is set to become different from feedback gain TAFB at step S10. At the nest step S17, transmission controller 7 calculates the engagement force feedback controlled variable TC2BFB from feedback control gain TBFB and the revolution speed converted value dNe of the slip rate deviation (SLIP−TSLIP) determined at step S10. At the next step S17, transmission controller 7 derives engagement force feedback controlled variable TC2BFB from feedback gain TBFB and revolution speed converted value dNe of the slip rate deviation (SLIP−TSLIP) determined at step S15.

At the next step S18, transmission controller 7 raises engagement force command value TC2 of engagement side clutch C2 by the value of TC2B corresponding to ramp gradient γ determined at step S14, adds feedback controlled variable TC2BFB derived at step S17 to TC2B so that engagement force command value TC2 of engagement side clutch C2 is gradually increased from instantaneous time t2, as shown in FIG. 4D, adjusts the engagement ramp gradient γ within the feedback controlled variable limit range as denoted by the dot-and-dash lines of FIG. 4D so as to approach the slip rate deviation (SLIP−TSLIP) to zero, and outputs engagement force command value TC2 of the engagement side clutch C2. The above-described engagement control of engagement side clutch C2 is continued until transmission controller 7 determines that slip rate SLIP of clutch C2 at step S26 is lowered equal to or below a set value FSLIP on a final engagement transfer condition and determines that a time t has reached to a scheduled time t3, viz., until engine revolution Ne reaches to time point B (instantaneous time t3) shown in FIG. 4C at which engine speed Ne is converged to the input revolution speed of the engagement side clutch (C2) after the gear shift occurs. It is noted that, when transmission controller 7 determines that the final engagement transfer condition of engagement side clutch C2 is satisfied at step S19, the engagement force of engagement side clutch C2 is raised by a final engagement gradient δ shown in FIG. 4D at a step S20, and, at a step S21, the engagement capacity of engagement side clutch C2 is deemed to be the complete (or perfect) engagement capacity. When time (t) has reached to an instantaneous time (time point) t4 (refer to FIG. 4D), a post-shift process is carried out at a step S22 at which release side clutch C1 is also engaged and, at a step S23, the gear shift is ended with a gear shift end flag set to "1" at a step S23. Then, the whole gear shift is ended.

Figure 5A:
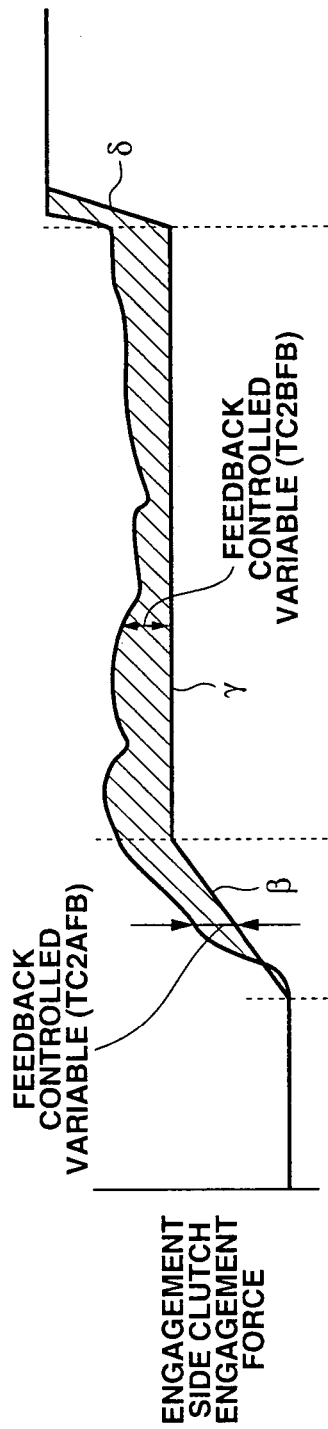
FIGS. 5A and 5B are integrally an operational timing chart for explaining a principle of operation in a gear shift control in which no influence of a polarity of a slip rate of an engagement side clutch is given.
Figure 5B:
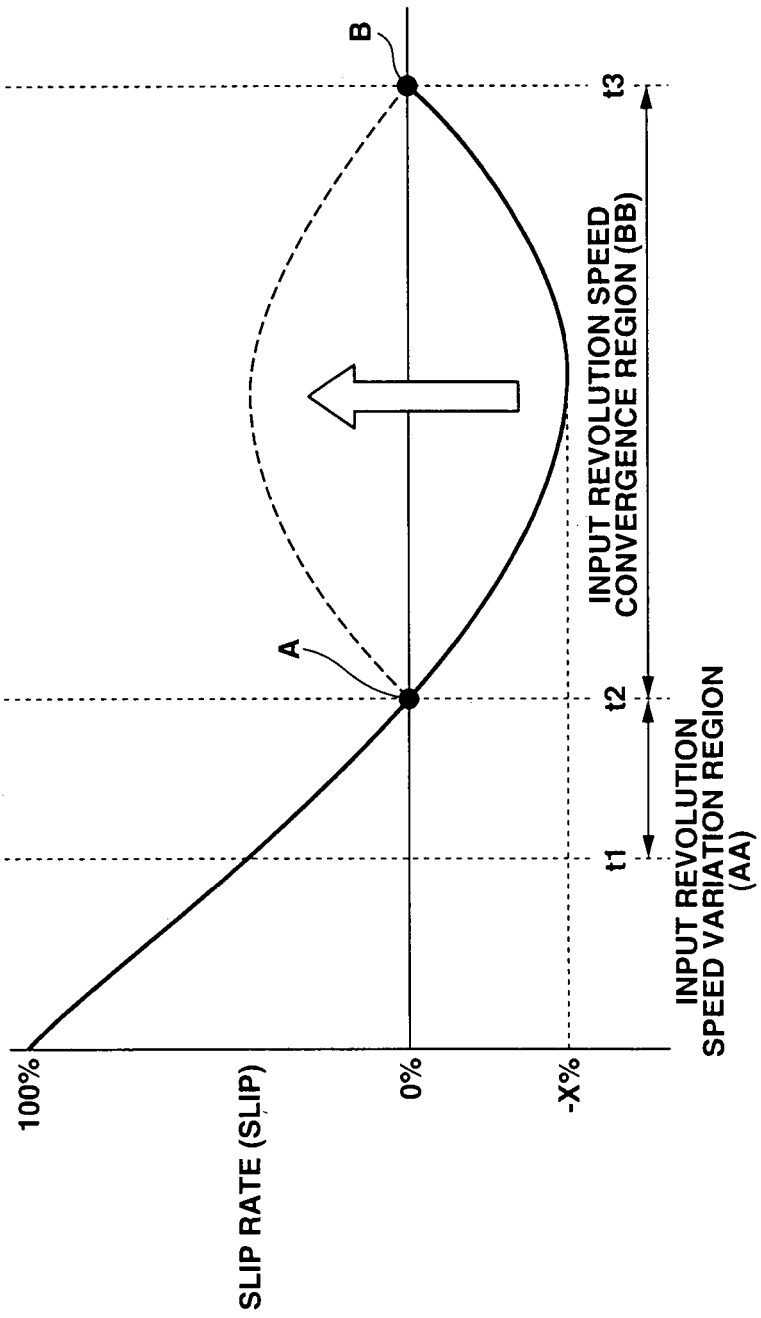

It is noted that, as appreciated from FIG. 4C, engine speed Ne (input revolution speed) is lower than the revolution speed of the clutch (C2) after the gear shift occurs corresponding to the gear ratio after the gear shift occurs in the input revolution speed variation region (AA) and, conversely, is higher than the revolution speed of the clutch (C2) after the gear shift occurs in the input revolution speed convergence region (BB). Hence, polarities of slip SLIP determined at steps S7 and S15 are naturally reversed between input revolution speed variation region (AA) and input revolution speed convergence region (BB), as denoted by a solid line shown in FIG. 5B. However, since slip rate SLIP at each of steps S7 and S15 is derived in a unit of its absolute value, slip rate SLIP even in input revolution speed convergence region (BB) can be treated as a positive value in the same way as input revolution speed variation region (AA), as denoted by a broken line of FIG. 5B. As shown in FIG. 5B, feedback controlled variable TC2AB in input revolution speed variation region (BB) is treated to have the same direction as feedback controlled variable TC2BFB in the input revolution speed convergence region (AA) and the engagement control for-engagement side clutch C2 can be carried out in the same direction. In this embodiment, the engagement advance of clutch C2 after the shift operation via coupling sleeves 54a, 55a, 56a, and 57a of manual transmission 3 is feedback controlled in such a manner that slip rate SLIP indicates target slip rate TSLIP for each engine torque Te. In details, a feedback control such that the input revolution speed (engine speed Ne) of clutch C2 is directed toward revolution speed after the gear shift occurs at a predetermined time variation rate is carried out. The input revolution speed (viz., engine speed Ne) of clutch C2 makes feedback control gain TAFB at the input revolution speed variation region (AA) in which the input revolution speed of clutch C2 is directed toward the revolution speed after the gear shift occurs is made different from feedback control gain TBFB at input revolution speed convergence region (BB) after the input revolution speed has reached to the revolution speed after the gear shift occurs. Hence, while an appropriate selection of feedback control gain TAFB in input revolution speed variation region (AA) does not give an excessively slow feeling of the gear shift with a gear shift response characteristic worsened to the vehicle driver and such an unfavorable situation that an engine racing occurs can be avoided, an appropriate selection of the feedback control gain in the input revolution speed convergence region (BB) permits the engagement advance to be achieved while absorbing the clutch slip at this time favorably and an occurrence of a large shift shock can be avoided, even if an effective gear ratio represented by input and output revolution speed ratio of the transmission at the corresponding input revolution convergence region (BB) has reached to the gear shift ratio after the gear shift occurs and, thereafter, has exceeded the gear ratio after the gear shift occurs in the opposite direction.

Figure 9A:
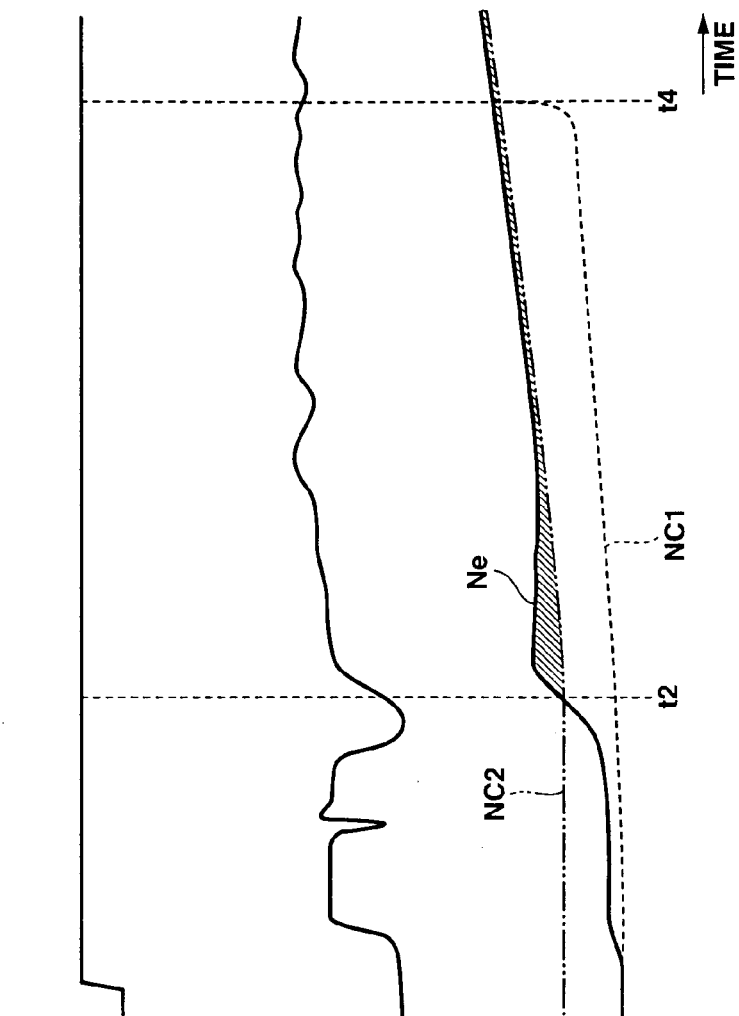
FIGS. 9A, 9B, and 9C are operation simulation timing charts in which a feedback control for an engagement force of a clutch is performed in the case of the first preferred embodiment of the automatic shift control apparatus shown in FIG. 1.
Figure 9B:
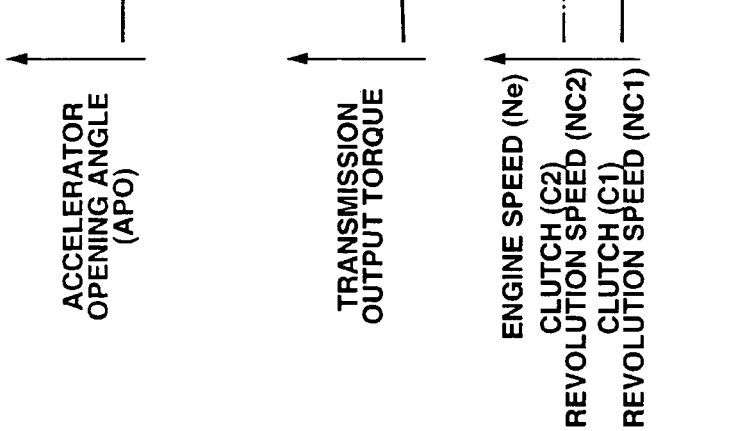
Figure 9C:
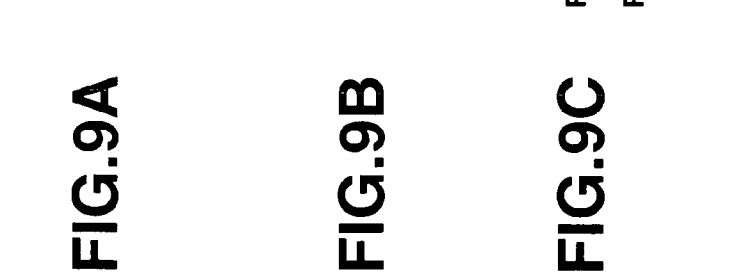

FIGS. 9A, 9B, and 9C integrally show an example of a simulation operation timing chart on the automatic shift control operation for the manual transmission in the above-described embodiment. As appreciated from a comparison of FIGS. 9A, 9B, and 9C with FIGS. 10A, 10B, and 10C which shows the simulation operation timing chart on an automatic shift control operation for the manual transmission in which no feedback control is carried out, an area of engine speed Ne denoted by a hatching is small. This means that, even if effective gear ratio has reached to the gear ratio after the gear shift occurs and, thereafter, has exceeded the gear ratio after the gear shift occurs in the opposite direction, it means that engine speed Ne can quickly and smoothly be converged into the revolution speed after the gear shift occurs.

In addition, in the first embodiment, transmission controller 7 determines that the transfer from input revolution speed variation region (AA) to input revolution speed convergence region (BB) occurs at step S13 shown in FIG. 3A on the basis of whether both conditions such that input revolution speed, viz., engine speed Ne has reached to the input revolution speed after the gear shift occurs and such that slip rate SLIP of clutch C2 is equal to or larger than zero are established. Hence, even if the control with the two revolution speed regions divided is carried out, the control using the same equations becomes possible without modification in the calculation equations. Furthermore, since target slip rate TSLIP for the feedback control is determined for each engine torque Te, it is possible to perform the engagement control of optimum clutch C2 in accordance with engine torque for each region (AA) and (BB). The case of the downshift operation in which clutch C1 is the release side clutch and clutch C2 is the engagement side clutch has been described. On the contrary, in both of a case of another gear shift where clutch C1 is the engagement side clutch and clutch C2 is the release side clutch and a case where the shift is not the downshift but an upshift, the same control procedure can be carried out and the same action and advantages can be achieved.

Figure 7A:
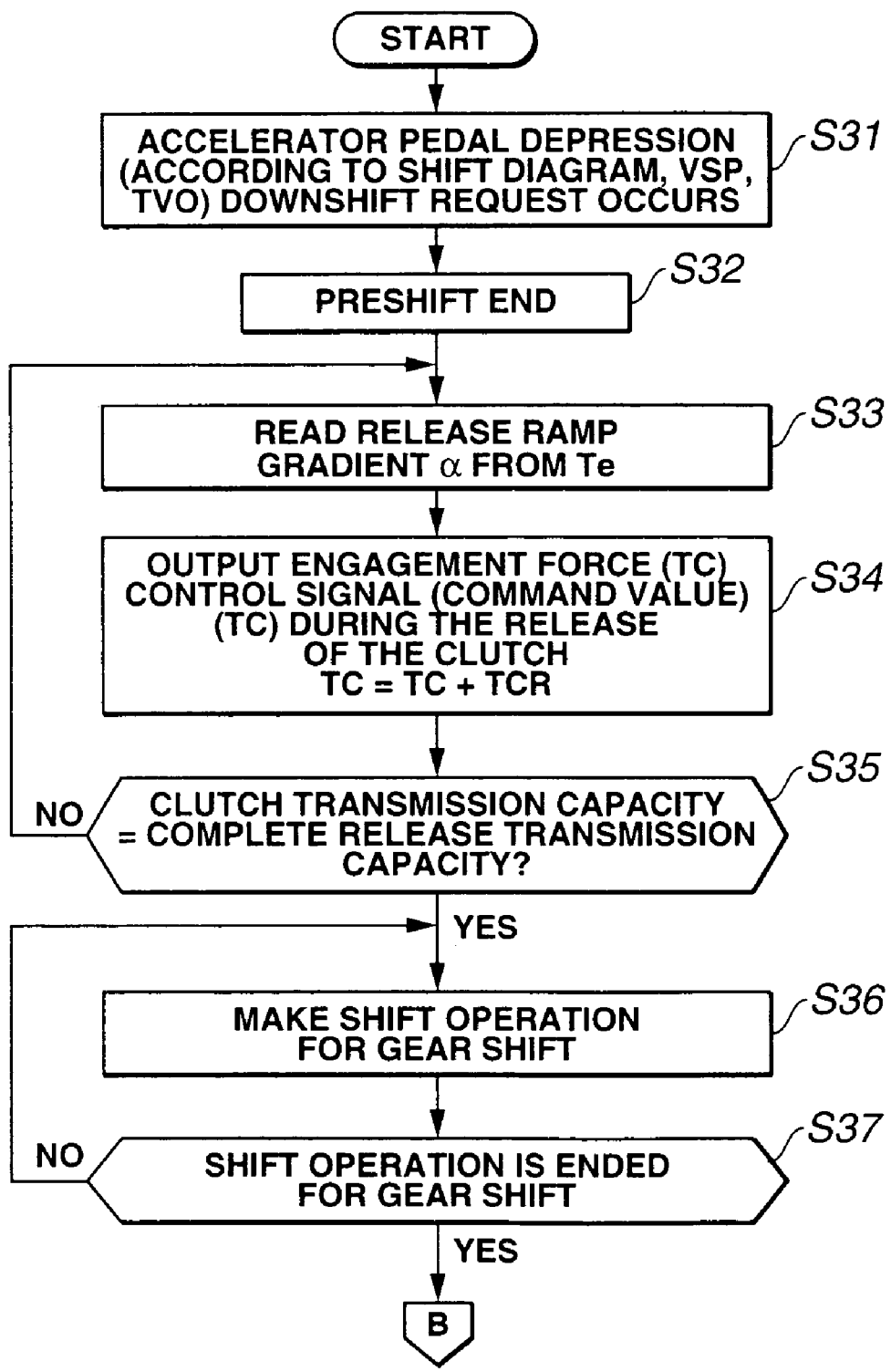
FIGS. 7A, 7B, and 7C are integrally an operational flowchart representing a control program of the automatic shift control apparatus in a second preferred embodiment according to the present invention.
Figure 7B:
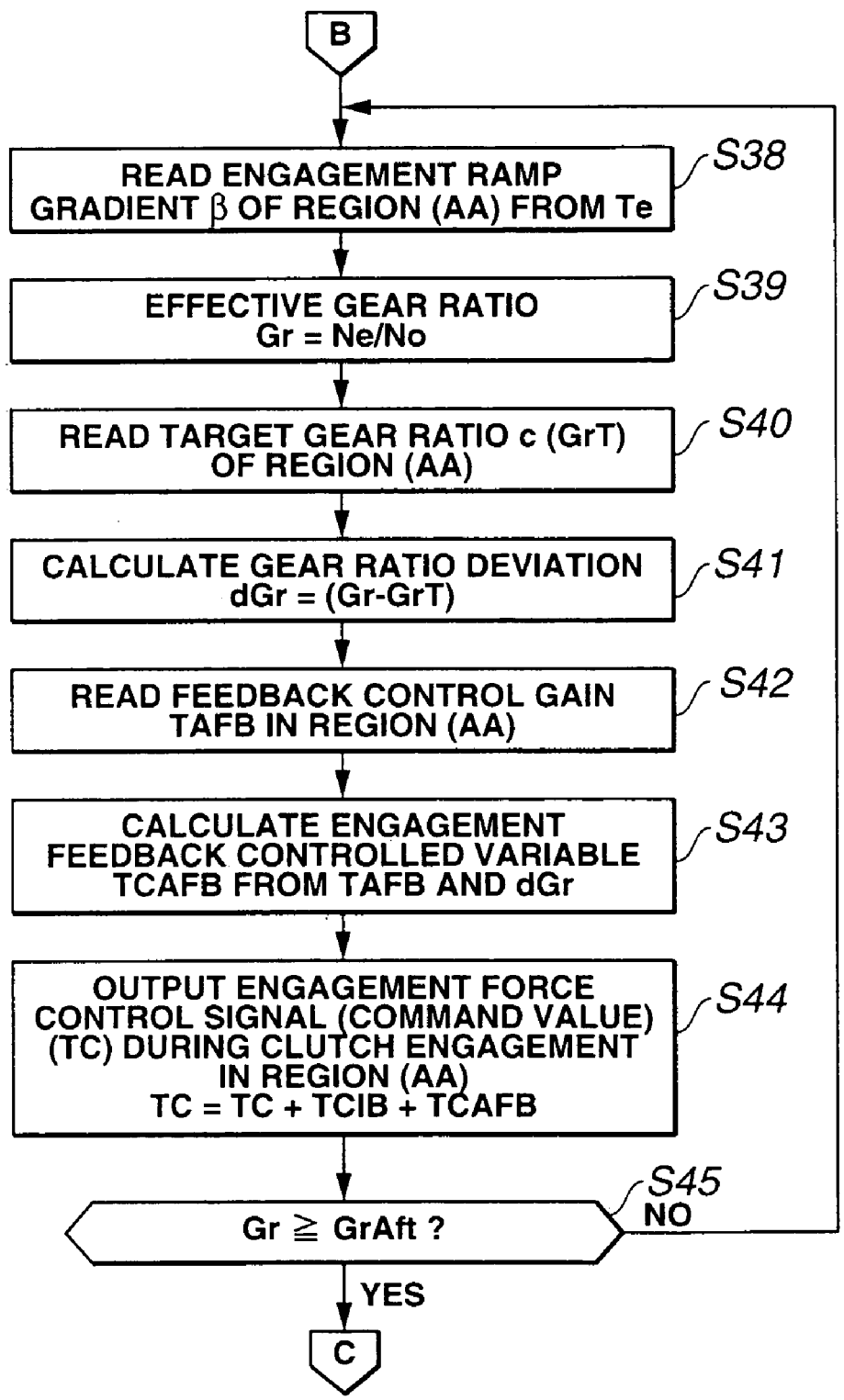
Figure 7C:
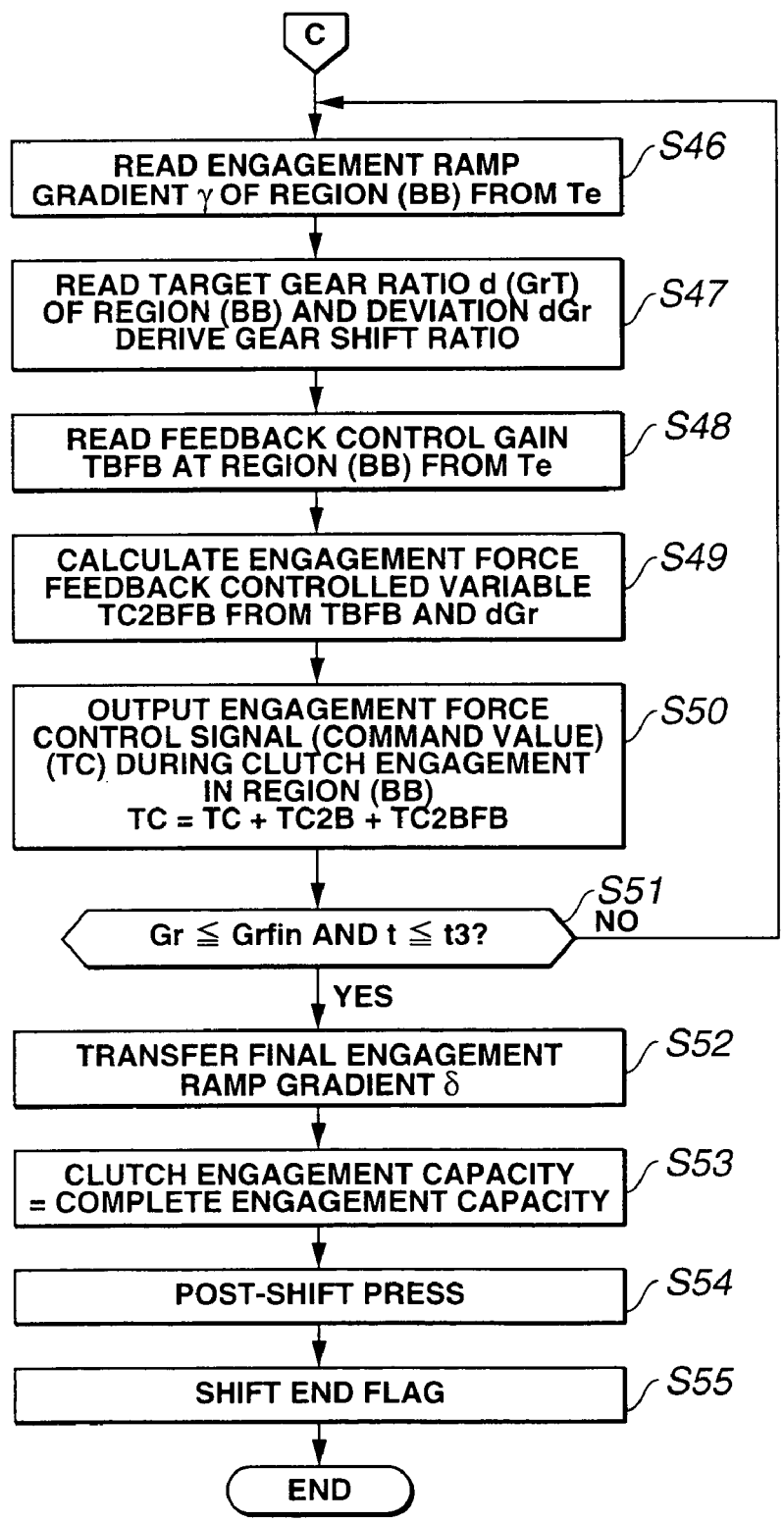

FIGS. 7A, 7B, and 7C integrally show an operational flowchart of a second preferred embodiment of the automatic shift control apparatus for the manual transmission. In this embodiment, the present invention is applicable to an automatic shift control apparatus for a generally available single clutch type manual transmission in which a single clutch only (C) is interposed between an engine and a manual transmission in place of the above-described twin clutch type manual transmission. FIGS. 8A through 8D integrally show a timing chart for the engagement force control carried out in the second embodiment. FIGS. 7A, 7B, and 7C are integrally show a control program corresponding to FIGS. 3A and 3B. It is noted that the structure of the automatic shift control apparatus in the second embodiment is generally the same as shown in FIG. 1. However, since the generally available single clutch type manual transmission to which the automatic shift control apparatus in the second embodiment is applicable, input revolution sensors 9 is replaced with an input revolution sensor and clutch position sensors 10 are replaced with a clutch position sensor.

When, in the single clutch type manual transmission, a downshift request is present along with the depression of accelerator pedal with the vehicle driver, a single clutch is, at first, released and the gear shift operation is subsequently carried out, and, thereafter, the single clutch is engaged. These series of operations will be described in details below with reference to FIGS. 7A through 7C.

At a step S31, transmission controller 7 determines whether the gear shift request occurs depending upon whether another gear shift which is different from the gear shift now being selected on the basis of a prescheduled gear shift pattern (gear shift diagram) shown in FIG. 6 according to vehicle speed (or vehicular velocity) VSP and opening angle TVO of throttle valve 20. If the downshift request along with the depression described above occurs, the pre-shift described below occurs at a step S32. A control at an instantaneous time (time point) to shown in FIG. 4D at which this pre-shift is ended is advanced to a step S33 or thereafter and the automatic gear shift is carried out which is aimed at the present invention as described in the following. At a step S33, transmission controller 7 determines a release ramp gradient α in accordance with engine torque Te, for example, as shown in FIG. 8D. At the next step S34, transmission controller 7 reduces command value TC of the engagement force during the release of the clutch by a value of TCR corresponding to ramp gradient α of the clutch so that engagement force command value TC is gradually reduced. Thus, command value TC of the engagement force during the release of the clutch is gradually reduced by ramp gradient α and the command value TC of the engagement force during the release of the clutch is outputted to clutch actuator (16). The processes in steps S33 and S34 are continued unless clutch engagement capacity (torque transmission capacity) is determined to indicate the complete release capacity.

According to an advance of the clutch release control, the controller 7 determines that the engagement capacity of the clutch at step S35 (torque transmission capacity) indicates the complete release capacity. At this time, at a step S36, the shift operation for the gear shift via coupling sleeve of manual transmission 3 is carried out. At a step S37, when the time reaches to instantaneous time t2 at which the shift operation is ended, the engagement control of the clutch is carried out in the following way after the next step S38 shown in FIG. 7B. That is to say, at step S38, an engagement ramp gradient β at the input revolution speed variation region (AA) is determined, for example, as shown in FIGS. 8A through 8D, in accordance with engine torque Te during a time interval between instantaneous times of t1 and t2 in which engine speed Ne which is the input revolution speed of the single clutch is directed toward the clutch revolution speed after the gear shift occurs corresponding to the gear ratio after the gear shift occurs.

At the next step S39, transmission controller 7 calculates an effective gear ratio Gr (=Ne/No) representing a ratio (Ne/No) of the transmission input/output revolution speeds Ne and No. At the next step S40, transmission controller 7 reads a target gear ratio c (GrT) as exemplified by FIGS. 8A through 8D at the input revolution speed variation region (AA). This target gear shift ratio c (GrT) is determined arbitrarily at a stage of design of the control system but according to this the flavoring (or characterization or tuning) of gear shift can be achieved.

At the next step S41, a deviation dGr (=Gr−GrT) between target gear ratio c (GrT) and effective gear ratio Gr is calculated by the transmission controller 7. At the next step S42, feedback gain TAFB for the engagement force control of the clutch to approach (nullify) gear shift ratio deviation dGr (=Gr−GrT) to zero in the input revolution speed variation region (AA) is determined in accordance with engine torque Te. At the next step S43, engagement force feedback controlled variable TCAFB is derived from feedback control gain TAFB and deviation dGr of gear ratio derived at step S41.

At a step S44, engagement force command value TC during the engagement of the clutch is raised by a value of TC1B corresponding to engagement ramp gradient β determined at step S38 and feedback controlled variable TCAFB derived at step S43 is added so that engagement force command value TC is gradually increased at ramp gradient β from instantaneous time t1 as shown in FIG. 8D, adjusts engagement force command value TC within the feedback controlled variable limit range denoted by a dot-and-dash line of FIGS. 8A through 8D so as to approach the gear shift ratio deviation dGr (=Gr−GrT) to zero, and command value TC of engagement force during the engagement of the clutch is outputted to clutch actuator (16). The clutch engagement control is continued until effective gear ratio Gr is determined to have reached to the gear ratio GrAft after the gear shift occurs, viz., until a time point C (instantaneous time t2) at which engine speed Ne reaches to the clutch revolution speed after the gear shift occurs as shown in FIGS. 8A through 8D.

After instantaneous time t2 shown in FIGS. 8A through 8D when Gr>GrAft at a step S45, the clutch engagement force control is carried out after a step S46 as follows: That is to say, at step S46, transmission controller 7 carries out an engagement ramp gradient γ in the input revolution speed convergence region (BB) during the time interval from a point C (instantaneous time t2) to a point D (instantaneous time t3) shown in FIG. 8C at which engine speed Ne has converged to the clutch revolution speed after the clutch revolution speed is converged is determined in accordance with engine torque Te, for example, as shown in FIGS. 8A through 8D.

At the next step S47, transmission controller 7 reads target gear shift ratio d (GrT) as exemplified by FIGS. 8A through 8D in input revolution speed convergence region (BB) (this target gear shift ratio d is determined arbitrarily at the stage of the design in accordance with the flavoring of the gear shift). Effective gear ratio Gr derived in the same way as step S39 and deviation dGr (=Gr−GrT) of the gear shift ratio is determined according to the same calculation at step S41.

At the next step S48, transmission controller 7 determines another feedback control gain TBFB for the engagement force control for the clutch to approach the deviation of the gear shift ratio dGr (=Gr−GrT) to zero in the input revolution speed convergence region (BB) in accordance with engine torque Te. It is noted that feedback control gain TBFB is set to be different from feedback control gain TAFB at step S42. At the next step S49, engagement force feedback controlled variable TC2BFB is derived from feedback gain TBFG and deviation dGr (=Gr−GrT) derived at step S47.

At the next step S50, command value TC for the engagement force during the engagement of the clutch is raised by TC2B corresponding to ramp gradient γ derived at step S46 and feedback controlled variable TC2BFB is added which is derived at step S49 so that command value TC for the engagement force during the engagement of the clutch is gradually increased at ramp gradient γ as shown in FIG. 8D, adjusts command value TC for the engagement force during the engagement of the clutch and the clutch engagement force command value TC is outputted to clutch actuator (16). The above-described clutch engagement control is continued until transmission controller 7 determines that effective gear ratio Gr at step S51 is determined to be lower than a set value Grfin on the final engagement transfer condition and time t is determined to have reached to the scheduled time point t3, viz., engine revolution speed Ne converges the clutch revolution speed after the engine revolution speed Ne has reached to a time point D (instantaneous time t3) in FIGS. 8A through 8D. It is noted that, when the final engagement transfer condition of the clutch is determined to be satisfied at step S51, then, at step S52, the engagement force of the clutch is raised at final engagement ramp gradient δ shown in FIGS. 8A through 8D, and, thereafter, at a step S53, the engagement capacity of the clutch is deemed to be complete engagement capacity. When the time t has reached to an instantaneous time (time point) t4 (refer to FIG. 8D), the post-shift process at step S54 is carried out. The gear shift end flag is set to "1" at a step S55, and the downshift of manual transmission is ended.

In this embodiment, the engagement advance of the clutch after the shift via one of coupling sleeves of the manual transmission and shift actuator is feedback controlled so that effective gear ratio Gr is coincident with target gear ratio GrT, viz., the clutch input revolution speed (engine speed Ne) is directed toward a revolution speed after the gear shift occurs, viz., the engagement operation is feedback controlled so that the input revolution speed of the clutch (engine speed Ne) is directed toward the revolution speed after the gear shift occurs at a predetermined time variation rate. Then, feedback control gain TAFB in the input revolution variation region (AA) while the input revolution speed (engine speed Ne) of the clutch is directed toward the revolution speed after the gear shift occurs is set to be different from feedback control gain TBFB in the input revolution speed convergence region (BB) after the input revolution speed (engine speed Ne) of the clutch has reached to the revolution speed after the gear shift occurs. Thus, the appropriate selection of feedback control gain TAFB in the input revolution variation region (AA) can avoid from giving such an excessively slow feeling of the gear shift with the gear shift response characteristic worsened to the vehicle driver and can avoid such a situation that the engine racing occurs. In addition, the appropriate selection of feedback control gain TBFB in the input revolution speed convergence region (BB) can avoid the large gear shift shock even if the effective gear ratio represented by the input and output revolution speed ratios of the transmission, in the input revolution speed convergence region (BB), has exceeded the gear ratio after the gear shift occurs in the opposite direction after the reach of the effective gear ratio reaches to the gear ratio after the gear shift occurs while absorbing the clutch slip at this time.

In addition, in this embodiment, the transfer determination from input revolution speed variation region (AA) to the input revolution convergence region (BB) carried out at step S45 is made when both of the condition that engine speed Ne which is input revolution speed of the clutch has reached to the revolution speed after the gear shift occurs and the other condition that effective gear ratio Gr has reached to the gear shift ratio GrAft after the gear shift occurs are established, the control routine using the same equations can be achieved even when the input revolution speed region is divided into two regions (AA) and (BB) without modification of the calculation equations. Furthermore, since target gear shift ratio GrT of the feedback control is defined for each engine torque Te, an optimum engagement force control of the clutch can be achieved for each of regions (AA) and (BB).

It is noted that the above explanation is based on the downshift but the same action and advantages can also be achieved in the case of the upshift.

Various changes and modifications may be made without departing from the scope and sprit of the present invention which is defined in the appended claims.

The entire contents of a Japanese Patent Application No. 2003-075142 (filed in Japan on Mar. 19, 2003) are herein incorporated by reference. The scope of the invention is defined with reference to the following claims.

What is claimed is:

1. An automatic shift control apparatus for a manual transmission, comprising:
   at least one clutch interposed between an engine and the manual transmission; and
   a controller that performs a feedback control for an engagement force of the at least one clutch after the controller ends a gear shift for the manual transmission in such a manner that an input revolution speed of the at least one clutch is directed toward another revolution speed thereof after the gear shift occurs at a predetermined time variation rate, the controller setting mutually different feedback control gains in a variation region of the input revolution speed of the at least one clutch in which the input revolution speed of the at least one clutch is directed toward another revolution speed, with respect to the input revolution speed, after the gear shift occurs and in a convergence region of the input revolution speed in which the input revolution speed of the at least one clutch has reached another revolution speed, with respect to the input revolution speed after the gear shift occurs.

2. An automatic shift control apparatus for a manual transmission as claimed in claim 1, wherein the controller comprises a region transfer determining section that determines that a region transfer from the variation region of the input revolution speed of the at least one clutch to the convergence region thereof occurs when both of a condition that the input revolution speed has reached another revolution speed, with respect to the input revolution speed, after the gear shift occurs and at least one of a condition that a slip rate of the at least one clutch is equal to or larger than zero and a condition that an effective gear ratio has reached a gear ratio after the gear shift occurs are established.

3. An automatic shift control apparatus for a manual transmission as claimed in claim 1, wherein the at least one clutch comprises two clutches for each group of gear shift stages, the gear shift stages being divided into two groups, and wherein the controller performs the feedback control for the engagement force for one of the two clutches which is an engagement side clutch when the gear shift occurs in such a manner that a slip rate of the engagement side clutch is made equal to a target slip rate for each engine torque.

4. An automatic shift control apparatus for a manual transmission as claimed in claim 3, wherein the controller performs the feedback control for the engagement force of the engagement side clutch in the variation region (AA) of the input revolution speed of the engagement side clutch (C2) in which the controller determines a first engagement ramp gradient (β) for the engagement side clutch in accordance with an engine torque (Te) in the variation region of the input revolution speed of the engagement side clutch and calculates a slip rate (SLIP) as follows:

SLIP =|(NC1−Ne)/(NC1−NC2)|, wherein Ne denotes an engine speed which corresponds to the input revolution speed of the engagement side clutch (C2), NC1 denotes a revolution speed of another clutch which is a release side clutch to be inputted to the manual transmission, NC2 denotes a revolution speed of the engagement side clutch to be inputted to the manual transmission, sets a target slip rate a (TSLIP), calculates a revolution speed converted value dNe of a deviation (SLIP−TSLIP) of the actual slip rate (SLIP) from the target slip rate (TSLIP), calculates a revolution speed converted value (dNe) of a deviation of the slip rate from the target slip rate as follows:

$dNe=(SLIP-TSLIP) \times (NC2-NC1)$, determines one of the feedback control gains (TAFB) of the engagement force control for the engagement side clutch (C2) in accordance with engine torque (Te) to approach the deviation on the slip rate to zero, determines a first engagement force control feedback controlled variable (TC2AFB) from the one of the feedback control gains (TAFB) and the slip rate deviation revolution speed converted value (dNe), raises an engagement force command value (TC2) for the engagement side clutch (C2) by each value (TC2A) which corresponds to the ramp gradient (β) and adds the feedback controlled variable (TC2AFB) to the engagement force command value (TC2) to output the engagement force command value (TC2=TC2+TC2A+TC2AFB) to a clutch actuator.

5. An automatic shift control apparatus for a manual transmission as claimed in claim 4, wherein, in the variation region of the input revolution speed of the engagement side clutch, the controller performs a release control for the another clutch which is a release side clutch and the controller determines a release ramp gradient (α) of an engagement force command value (TC1) for the release side clutch in accordance with the engine torque (Te) and lowers the engagement force command value (TC1) of the release side clutch (C1) by each value (TC1B) which corresponds to the ramp gradient (α) of the engagement force command value for the release side clutch (C1), the lowered engagement force command value being outputted from the controller to a clutch actuator.

6. An automatic shift control apparatus for a manual transmission as claimed in claim 5, wherein the controller continues the release control for the release side clutch (C1) until an engagement capacity of the release side clutch indicates a complete release capacity.

7. An automatic shift control apparatus for a manual transmission as claimed in claim 6, wherein the controller performs the feedback control for the engagement force for the engagement side clutch in a convergence region of the input revolution speed of the engagement side clutch when an engagement capacity of the release side clutch (C1) indicates a complete release capacity and when the calculated slip rate is equal to or larger than zero.

8. An automatic shift control apparatus for a manual transmission as claimed in claim 6, wherein the controller performs the feedback control for the engagement force of the engagement side clutch (C2) in the convergence region of the input revolution speed of the engagement side clutch when the input revolution speed of the engagement side clutch which corresponds to an engine speed (Ne) has reached another revolution speed, with respect to the input revolution speed, of the engagement side clutch which corresponds to a gear ratio after the gear shift occurs.

9. An automatic shift control apparatus for a manual transmission as claimed in claim 8, wherein the controller performs the feedback control for the engagement force of the engagement side clutch (C2) in the convergence region (BB) of the input revolution speed of the engagement side clutch (C2) in which the controller determines a second engagement ramp gradient (γ) for the engagement side clutch in accordance with the engine torque (Te) in the convergence region of the input revolution speed of the engagement side clutch, calculates the slip rate (SLIP) as follows:

$SLIP=|(NC1-Ne)/(NC1-NC2)|$, sets a target slip rate b (TSLIP), calculates a revolution speed converted value (dNe) of a deviation (SLIP−TSLIP) of the actual slip rate (SLIP) from the target slip rate b (TSLIP), calculates a revolution speed converted value (dNe) of the deviation of the slip rate (SLIP) from the target slip rate b (TSLIP) as follows:

$dNe=(SLIP-TSLIP) \times (NC2-NC1)$, determines another of the feedback control gains (TBFB) of the engagement force control for the engagement side clutch (C2) in accordance with engine torque (Te) to approach the deviation between the slip rate (SLIP) and the target slip rate b (TSLIP) to zero, a value of the another of the feedback control gains (TBFB) being different from that of the one of the feedback control gains (TAFB), determines a second engagement force control feedback controlled variable (TC2BFB) from the another of the feedback control gains (TBFB) and the slip rate deviation revolution speed converted value (dNe), raises the engagement force command value (TC2) for the engagement side clutch (C2) by each value (TC2B) which corresponds to the second ramp gradient (γ) and adds the feedback controlled variable (TC2AFB) to the engagement force command value (TC2) to output the engagement force command value (TC2=TC2+TC2B+TC2BFB) to the clutch actuator.

10. An automatic shift control apparatus for a manual transmission as claimed in claim 9, wherein the controller carries out the engagement force control for the engagement side clutch (C2) in the convergence region of the input revolution speed of the engagement side clutch until the slip rate (SLIP) of the engagement side clutch is equal to or below a set value (FSLIP) on a final engagement transfer condition and time (t) has reached to a predetermined time point(t3).

11. An automatic shift control apparatus for a manual transmission as claimed in claim 9, wherein the controller carries out the engagement force control for the engagement side clutch (C2) in the convergence region up to a time point (t3) at which the input revolution speed of the engagement side clutch (C2) has converged to another revolution speed, with respect to the input revolution speed, after the gear shift occurs.

12. An automatic shift control apparatus for a manual transmission as claimed in claim 1, wherein the at least one clutch is a single clutch of the manual transmission and the controller performs the feedback control for an engagement force of the at least one clutch in such a manner that an effective gear ratio becomes a target gear ratio.

13. An automatic shift control apparatus for a manual transmission as claimed in claim 12, wherein
the controller determines a release ramp gradient (α) in accordance with an engine torque (Te), lowers an engagement force command value (TC) by each value (TCR) corresponding to the release ramp gradient (α) and outputs a progressively lowering engagement force command value (TC) during a release operation by the release ramp gradient (α) to a clutch actuator in response to a shift change request until an engagement capacity of the clutch indicates a complete release capacity.

14. An automatic shift control apparatus for a manual transmission as claimed in claim 13, wherein, when the controller determines that a shift operation is ended, the controller performs the feedback control for the engagement force of the clutch in which the controller determines a first engagement ramp gradient (β) in the variation region of the input revolution speed of the clutch in accordance with the engine torque (Te), calculates the effective gear ratio (Gr), reads the target gear ratio, calculates a deviation (dGr=Gr−GrT) between the effective gear ratio (Gr) and the target gear ratio (GrT), sets one of the feedback control gains (TAFB) of the engagement force control, in a variation region (AA) of the input revolution speed of the clutch in accordance with the engine torque (Te) to approach the deviation (dGr) between the effective gear ratio (Gr) and the target gear ratio (GrT) to zero, determines an engagement force feedback controlled variable (TCAFB) from the one feedback control gain (TAFB) and the deviation (dGr) between an effective gear ratio (Gr) and the target gear ratio (GrT), raises an engagement force command value (TC) during the engagement of the clutch by each value (TC1B) corresponding to the first engagement ramp gradient (β) and adds the feedback controlled variable (TCAFB) to the engagement force command value (TC) to output the added engagement force command value (TC=TC+TC1B+TCAFB) to the clutch actuator.

15. An automatic shift control apparatus for a manual transmission as claimed in claim 14, wherein the controller performs, in the variation region of the input revolution speed of the clutch, the feedback control for the engagement force of the clutch until the effective gear ratio (Gr) has reached to a gear shift ratio (GrAft) after the gear shift occurs.

16. An automatic shift control apparatus for a manual transmission as claimed in claim 14, wherein, when the controller determines a second engagement ramp gradient (γ) in the convergence region of the input revolution speed of the clutch which corresponds to an engine speed (Ne) in accordance with the engine torque (Te), reads the target gear ratio d (GrT), calculates the deviation (dGr) between the effective gear ratio (Gr) and the target gear shift ratio (GrT), sets the another of the feedback control gains (TBFB) for the engagement force control of the clutch to approach the deviation (dGr) in the convergence region (BB) of the input revolution speed to zero, a value of the second feedback control gain (TBFB) being different from that of the first feedback control gain (TAFB), raises the engagement force command value (TC) during the engagement of the clutch by each value (TC2B) corresponding to the second ramp gradient (γ), and outputs the engagement force command value (TC) at the second engagement ramp gradient (γ), and outputs the engagement force command value (TC) by the second engagement ramp gradient (γ) to approach the deviation (dGr) between the effective gear ratio (Gr) and the target gear ratio (GrT) to zero.

17. An automatic shift control apparatus for a manual transmission as claimed in claim 16, wherein
the controller carries out the feedback control for the engagement force of the clutch in the convergence region of the input revolution speed until the effective gear ratio (Gr) is equal to or less than a set value (Grfin) for a final engagement transfer condition and the time has reached to a time point (t3) at which the engine speed (Ne) has reached another revolution speed, with respect to the input revolution speed, of the clutch which corresponds to the gear ratio after the gear shift occurs.

18. An automatic shift control apparatus for a manual transmission as claimed in claim 16, wherein the effective gear ratio (Gr) is represented by a ratio between input and output revolution speeds (Ne, No) of the manual transmission and the target gear ratios (GrT) in both of the variation and convergence regions of the input revolution speed of the clutch are arbitrarily set.

19. An automatic shift control apparatus for a manual transmission, comprising:
clutch means interposed between an engine and the manual transmission; and
controlling means that performs a feedback control for an engagement force of the clutch means after the controller ends a gear shift for the manual transmission in such a manner that an input revolution speed of the clutch means is directed toward another revolution speed, with respect to the input revolution speed, thereof after the gear shift occurs at a predetermined time variation rate, the controlling means setting mutually different feedback control gains in a variation region of the input revolution speed of the clutch means in which the input revolution speed of the clutch means is directed toward another revolution speed, with respect to the input revolution speed, after the gear shift occurs and in a convergence region of the input revolution speed in which the input revolution speed of the clutch means has reached to another revolution speed, with respect to the input revolution speed, after the gear shift occurs.

20. An automatic shift control method for a manual transmission, comprising:
providing at least one clutch interposed between an engine and the manual transmission;
performing a feedback control for an engagement force of the at least one clutch after a gear shift for the manual transmission is ended in such a manner that an input revolution speed of the at least one clutch is directed toward another revolution speed thereof after the gear shift occurs at a predetermined time variation rate; and, while performing the feedback control for the engagement force of the at least one clutch, setting mutually different feedback control gains in a variation region of the input revolution speed of the at least one clutch in which the input revolution speed of the at least one clutch is directed toward another revolution speed, with respect to the input revolution speed, after the gear shift occurs and in a convergence region of the input revolution speed in which the input revolution speed of the at least one clutch has reached another revolution speed, with respect to the input revolution speed, after the gear shift occurs.

* * * * *